(12) United States Patent
Yu

(10) Patent No.: US 11,054,111 B2
(45) Date of Patent: Jul. 6, 2021

(54) ILLUMINATING DEVICE

(71) Applicant: VEELED INCORPORATION, Taichung (TW)

(72) Inventor: Henry Yu, Taichung (TW)

(73) Assignee: VEELED INCORPORATION, Taichung (TW)

( * ) Notice: Subject to any disclaimer, the term of this patent is extended or adjusted under 35 U.S.C. 154(b) by 0 days.

(21) Appl. No.: 16/731,065

(22) Filed: Dec. 31, 2019

(65) Prior Publication Data

US 2020/0217482 A1    Jul. 9, 2020

(30) Foreign Application Priority Data

Jan. 3, 2019    (TW) .................. 108200080

(51) Int. Cl.
| | | |
|---|---|---|
| *F21V 5/04* | (2006.01) | |
| *A01G 7/04* | (2006.01) | |
| *G02B 27/09* | (2006.01) | |
| *F21Y 115/10* | (2016.01) | |
| *F21Y 115/15* | (2016.01) | |

(52) U.S. Cl.
CPC .............. *F21V 5/04* (2013.01); *A01G 7/045* (2013.01); *G02B 27/0916* (2013.01); *G02B 27/0955* (2013.01); *F21V 5/046* (2013.01); *F21V 5/048* (2013.01); *F21Y 2115/10* (2016.08); *F21Y 2115/15* (2016.08)

(58) Field of Classification Search
CPC . F21V 5/04; F21V 5/046; F21V 5/048; A01G 7/045; G02B 27/0916; G02B 27/0955
USPC ...................................... 362/311.02
See application file for complete search history.

(56) References Cited

U.S. PATENT DOCUMENTS

| | | | | |
|---|---|---|---|---|
| 2014/0328069 | A1* | 11/2014 | Jeong ................. | G02B 19/0061 362/335 |
| 2015/0036347 | A1* | 2/2015 | Hu .......................... | F21V 5/008 362/268 |
| 2015/0041837 | A1* | 2/2015 | Chinniah ............... | F21V 29/713 257/98 |
| 2015/0184828 | A1* | 7/2015 | Dai ..................... | G02B 19/0009 362/311.02 |
| 2015/0378214 | A1* | 12/2015 | Tran ......................... | F21V 7/00 349/64 |
| 2018/0259153 | A1* | 9/2018 | Gommans .......... | G02B 19/0014 |
| 2018/0347786 | A1* | 12/2018 | Feng .................. | G02B 19/0061 |

* cited by examiner

*Primary Examiner* — Laura K Tso
(74) *Attorney, Agent, or Firm* — CKC & Partners Co., LLC

(57) ABSTRACT

An illuminating device includes a light source and a light-pattern generating member. The light source emits an incident light. The light-pattern generating member is disposed on a side of the light source to receive the incident light. The incident light passes through the light-pattern generating member so as to generate a transmission light. The transmission light generates a light pattern. A light intensity distribution is formed by the light pattern, and a light intensity near the light source is equal to a light intensity far from the light source.

2 Claims, 9 Drawing Sheets

ILLUMINATING DEVICE

RELATED APPLICATIONS

This application claims priority to Taiwan Application Serial Number 108200080, filed Jan. 3, 2019, which is herein incorporated by reference.

BACKGROUND

Technical Field

The present disclosure relates to an illuminating device. More particularly, the present disclosure relates to an illuminating device capable of generating a plurality of transmission lights with different light intensities via a light-pattern generating member, so as to provide a uniform illumination according to the irregular shape of plants or pots.

Description of Related Art

In the general nature, the sunlight can almost provide a broad spectrum covering the ultraviolet region, the visible region and the infrared region. There are studies have proven that illuminating plants will affect plants growing. For example, the purple-light wave of the purple light region can inhibit the growth hormone in the plant, make the plant grow into a short thick shape, and also affect the phototropism of the plant. The blue-light wave and the cyan-light wave in the visible region can promote the formation of anthocyanin. The red-light wave can promote the decomposition of carbon dioxide and the formation of chlorophyll.

However, in most cases, based on changes in the weather of nature, or changes in the growth environment of plants, there are still situations in which plants cannot receive the sunlight in nature for a long time, so as to make the plants growing poor. Nowadays, artificial light sources other than natural sunlight have been developed, and the plants are placed indoors for illuminated, so that the plants can receive light constantly and promote plant growth. Further, the artificial light sources can adjust the wavelength through various methods, which are also helpful to promote the specific growth conditions of plants. However, the natural growth appearance of plants is not completely consistent. Therefore, under a single light source, light intensities of light receiving areas are different, which cannot control the plants growing uniformly. Although there are people who use multiple light sources, which needs considerable space and the construction cost is too expansive. Therefore, it is still a need to develop an illuminating device that can provide uniform light intensity to plants and specific wavebands through simple arrangements.

SUMMARY

According to one aspect of the present disclosure, an illuminating device includes a light source and a light-pattern generating member. The light source emits an incident light. The light-pattern generating member is disposed on a side of the light source to receive the incident light. The incident light passes through the light-pattern generating member so as to generate a transmission light. The transmission light generates a light pattern. A light intensity distribution is formed by the light pattern, and a light intensity near the light source is equal to a light intensity far from the light source.

According to another aspect of the present disclosure, an illuminating device includes a light source and a light-pattern generating member. The light source emits an incident light. The light-pattern generating member is disposed on a side of the light source to receive the incident light and includes a plurality of shading areas. Shading rates of the shading areas are different. The incident light passes through each of the shading areas to generate a plurality of transmission lights with different light intensity decay rates so as to form a light intensity distribution, and a light intensity near the light source is equal to a light intensity far from the light source.

According to another aspect of the present disclosure, an illuminating device includes a light source and a light-pattern generating member. The light source emits an incident light. The light-pattern generating member is disposed on a side of the light source to receive the incident light and includes a plurality of shading areas sequentially arranged from a central portion of the light-pattern generating member to a peripheral portion of the light-pattern generating member. Shading rates of the shading areas decrease from the central portion of the light-pattern generating member to the peripheral portion of the light-pattern generating member. The incident light passes through each of the shading areas to generate a plurality of transmission lights with light intensity decay rates decreasing from the central portion of the light-pattern generating member to the peripheral portion of the light-pattern generating member so as to form a light intensity distribution, and a light intensity near the light source is equal to a light intensity far from the light source.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
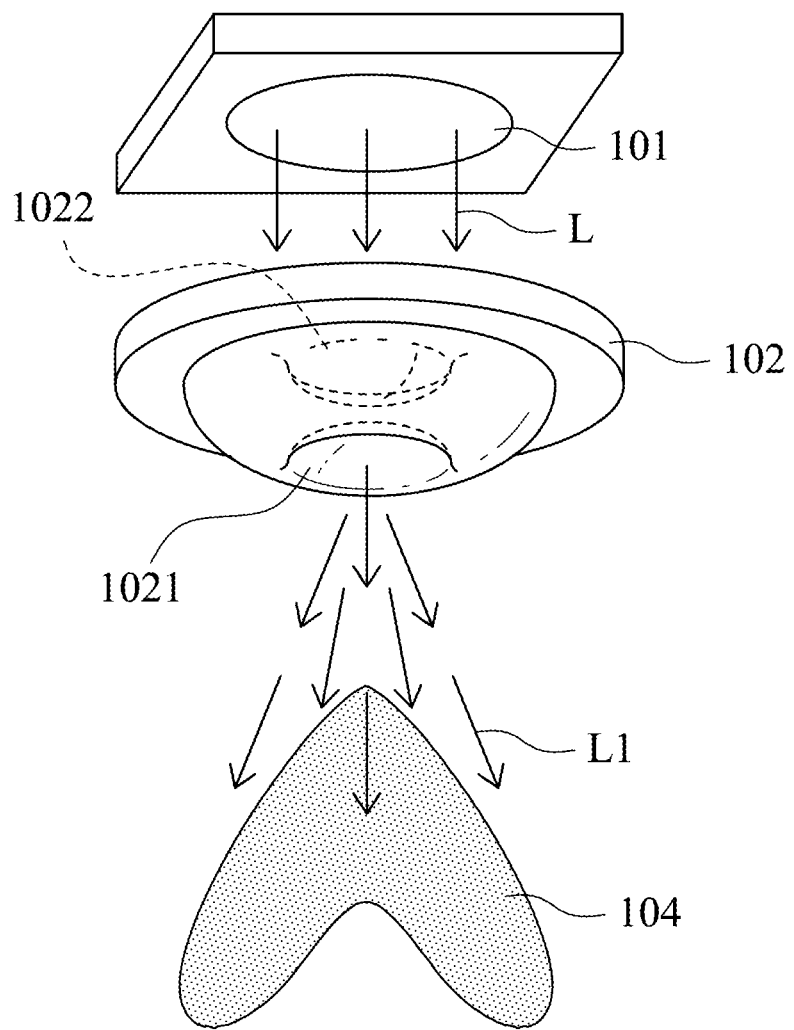
FIG. 1 is a structural schematic view of an illuminating device according to one embodiment of the present disclosure.
Figure 2:
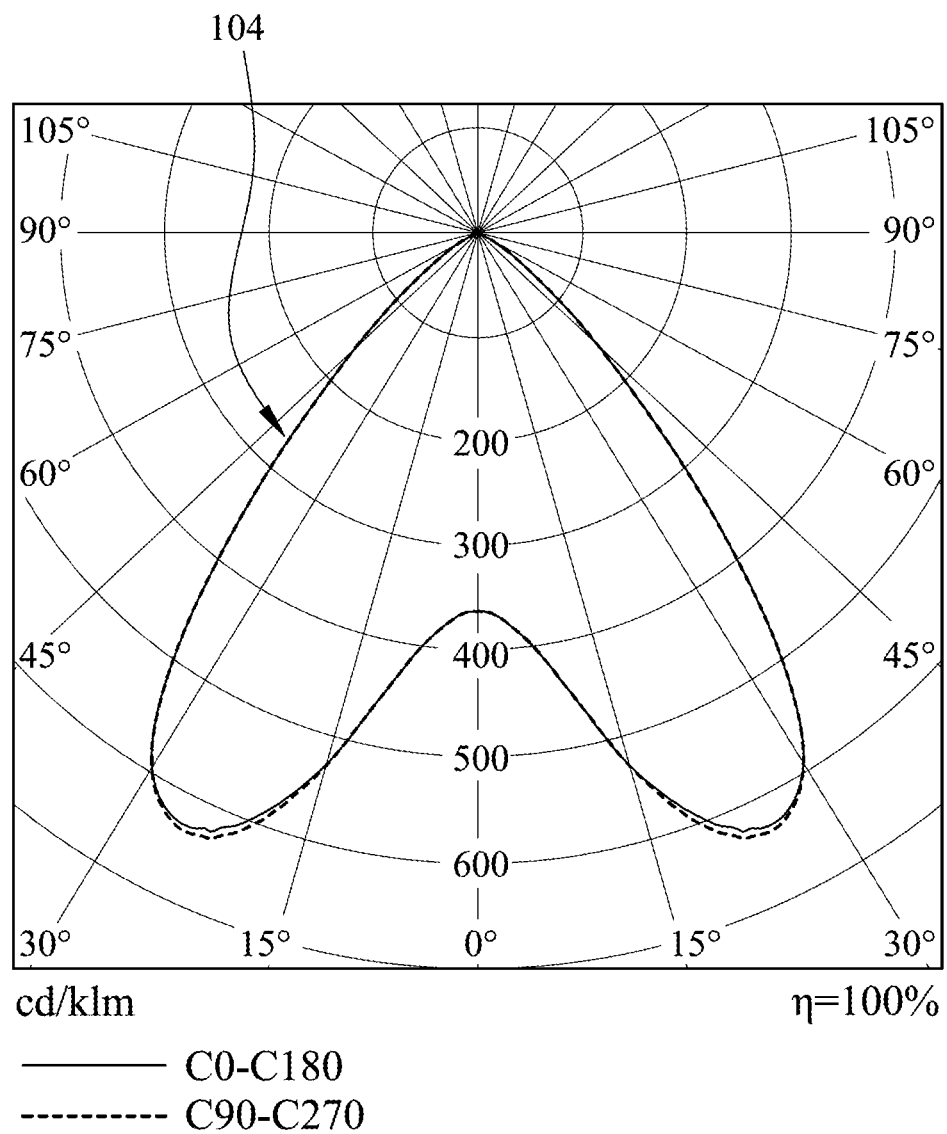
FIG. 2 is a light-pattern schematic view of the illuminating device according to the embodiment of FIG. 1.
Figure 3:
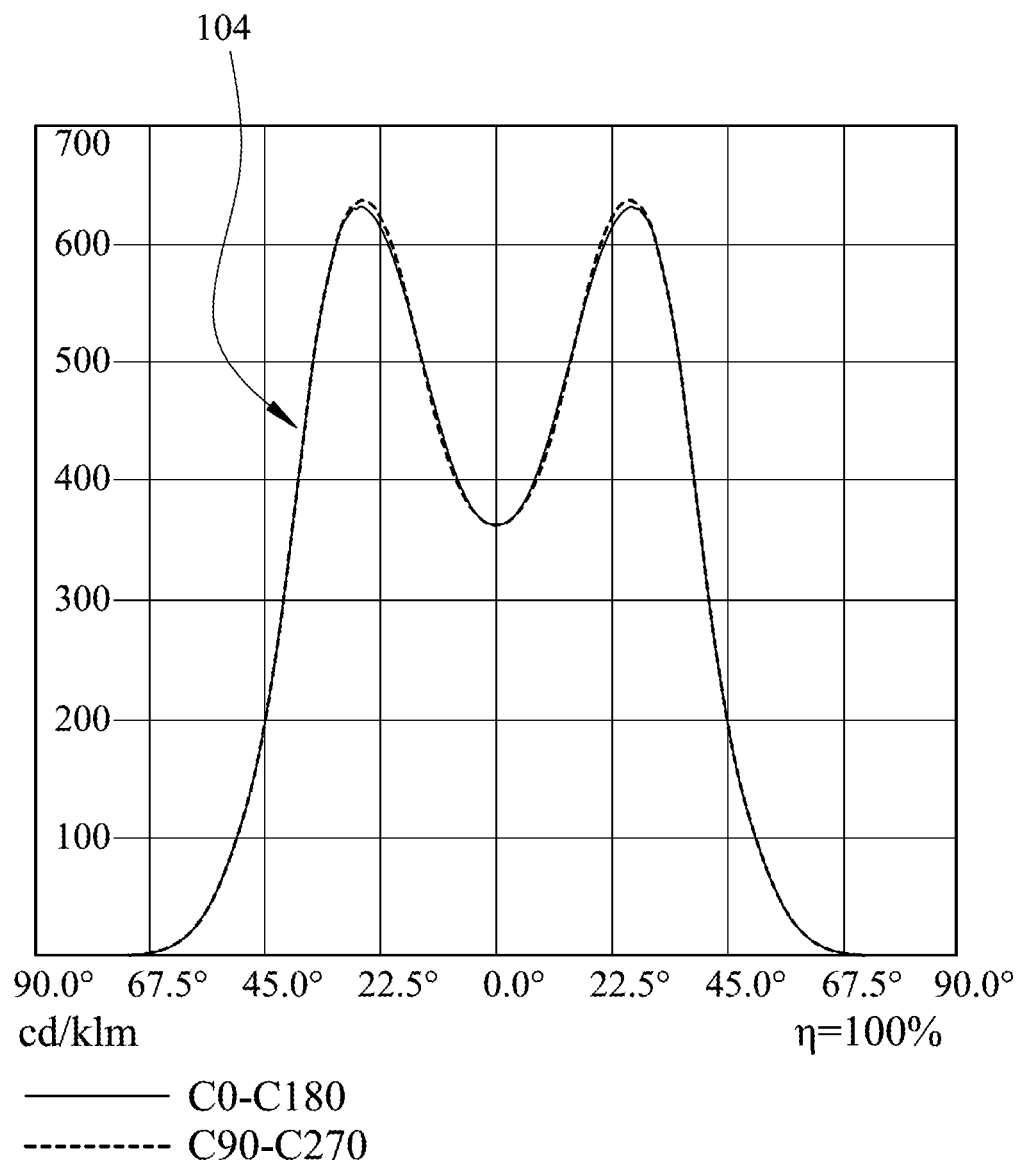
FIG. 3 is another light-pattern schematic view of the illuminating device according to the embodiment of FIG. 1.

FIG. 1 is a structural schematic view of an illuminating device 100 according to one embodiment of the present disclosure. FIG. 2 is a light-pattern 104 schematic view of the illuminating device 100 according to the embodiment of FIG. 1. FIG. 3 is another light-pattern 104 schematic view of the illuminating device 100 according to the embodiment of FIG. 1. The illuminating device 100 includes a light source 101 and a light-pattern generating member 102. The light source 101 emits an incident light L. The light-pattern generating member 102 is disposed on a side of the light source 101 to receive the incident light L. The incident light L passes through the light-pattern generating member 102 so as to generate a transmission light L1. The transmission light L1 generates a light pattern 104, wherein the transmission light L1 at the peripheral portion of the light pattern 104 has a high light intensity relative to the transmission light L1 at other portions of the light pattern 104.

In the conventional art, the farther from the light source 101, the weaker the light intensity of the transmission light L1, which will cause uneven illumination. In the present disclosure, by arranging the special structure of the light pattern 104, the high light intensity of the transmission light L1 at farther place can still be maintained. In other words, when the plant 103 is illuminated by the transmission light L1, the peripheral portion of the light pattern 104 can still maintain a high light intensity relative to the transmission light L1 at other portions of the light pattern 104. Therefore, a light intensity distribution can be formed by the light pattern 104, wherein a light intensity near the light source 101 is equal to a light intensity far from the light source 101. The light intensity distribution can conform to the growing shape of the plant 103 and can provide a uniform illumination. Further, it is favorable for covering the entire range of the plant 103 by the special structure of the light pattern 104, and the uniformity of illumination can be increased substantially. It should be mentioned that the illuminating device 100 of the present disclosure can be applied to potted plants, indoor landscaping, etc., which has a wide range of applications.

In order to form the light pattern 104 with the special structure, the light-pattern generating member 102 can be a lens element. In detail, as shown in FIG. 1, the light-pattern generating member 102 can include a first concave portion 1021 and a second concave portion 1022. The first concave portion 1021 is disposed on one side of the light-pattern generating member 102. The second concave portion 1022 is disposed on the other side of the light-pattern generating member 102. Further, the optical parameters (e.g. surface shape, radius of curvature, etc.) of the light-pattern generating member 102 can be adjusted to obtain the desired shape of the light pattern 104.

Specifically, with the special structure of the light-pattern generating member 102 in the embodiment of FIG. 1, the light pattern 104 shown in FIGS. 2 and 3 can be formed. In the embodiment of FIG. 1, the first concave portion 1021 and the second concave portion 1022 are disposed at a central portion of the light-pattern generating member 102. Therefore, a light-concentrating effect can be generated at a peripheral portion of the light-pattern generating member 102, and the light pattern 104 similar to the shape of a boomerang can be generated, which can correspond to the special shape of the plant 103.

Further, as shown in FIG. 2, the light pattern 104 has a comparable light distribution in a cross section of C0-C180 and a cross section of C90-C270, it means that the light-pattern generating member 102 can generate the light pattern 104 with very uniform illumination. As shown in FIG. 3, a light intensity of the peripheral portion of the light pattern 104 is stronger than a light intensity of the central portion of the light pattern 104 so as to form the light intensity distribution, wherein the light intensity near the light source 101 is equal to the light intensity far from the light source 101.

Figure 4:
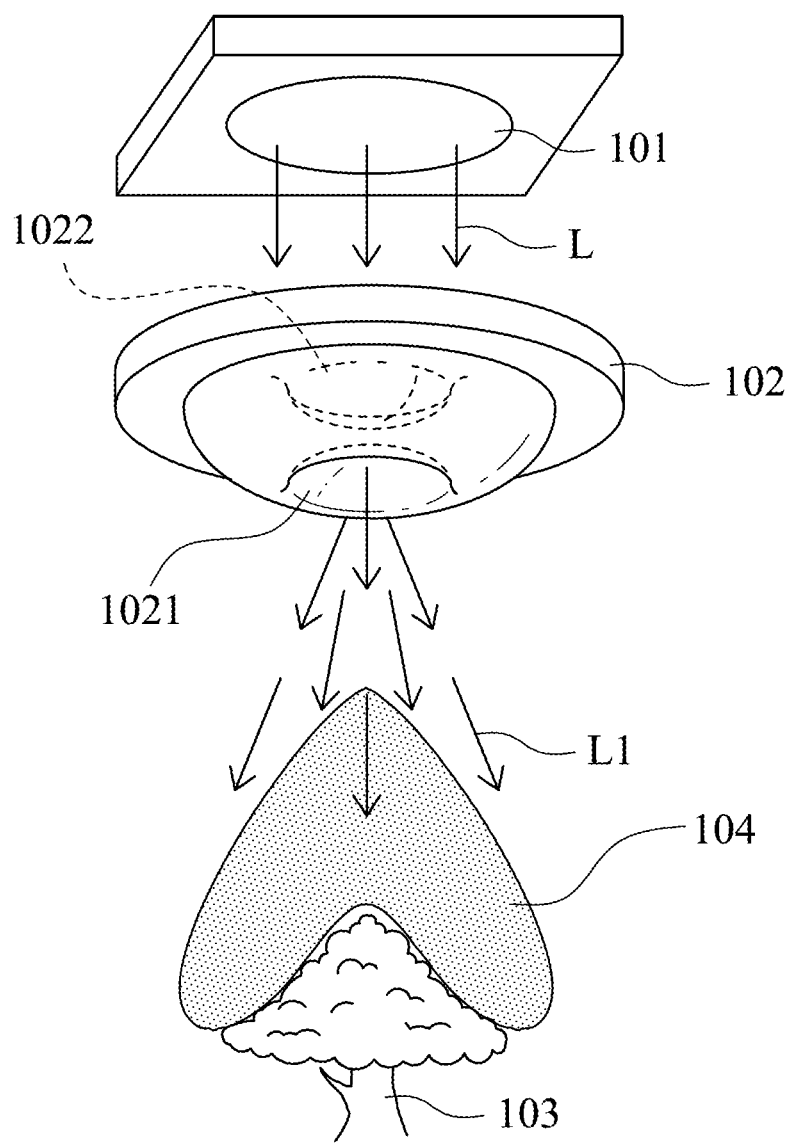
FIG. 4 is a schematic view of a using state of the illuminating device according to the embodiment of FIG. 1.
Figure 5:
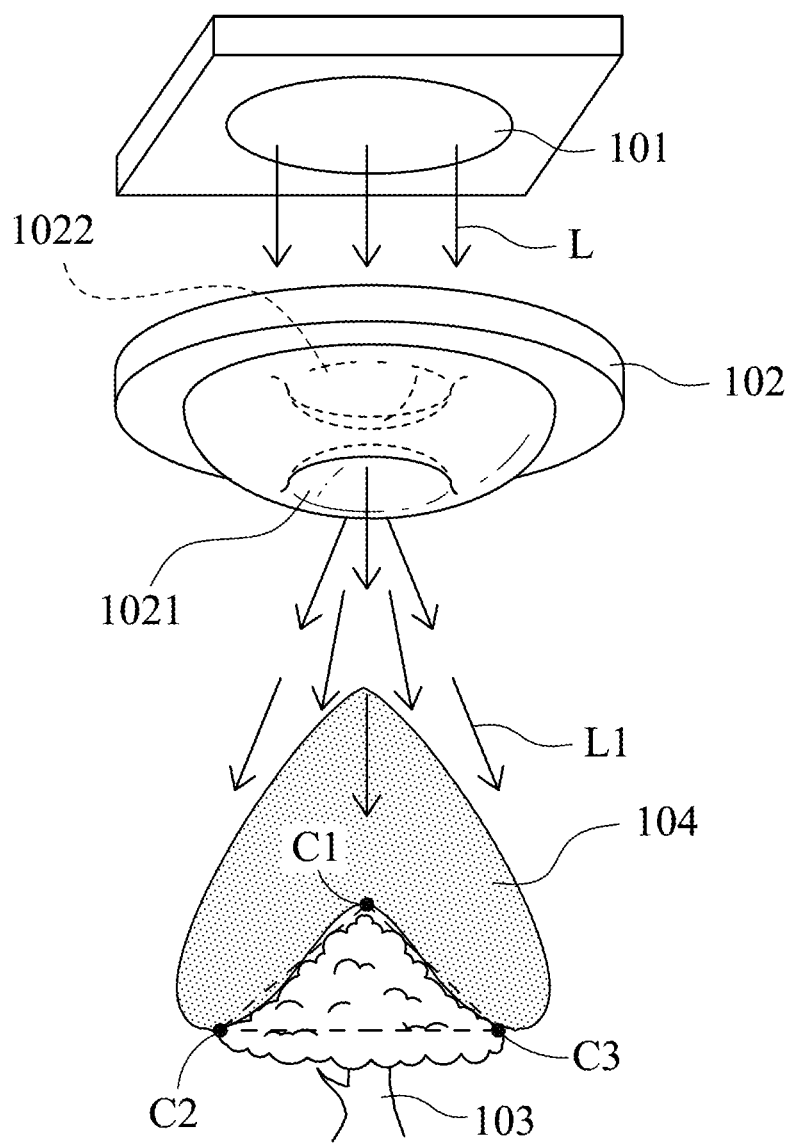
FIG. 5 is a schematic view of the light intensity distribution of the illuminating device according to the embodiment of FIG. 4.

FIG. 4 is a schematic view of a using state of the illuminating device 100 according to the embodiment of FIG. 1. FIG. 5 is a schematic view of the light intensity distribution of the illuminating device 100 according to the embodiment of FIG. 4. In FIG. 4, when the light pattern 104 generated by the transmission light L1 illuminates to the plant 103, the light pattern 104 can cover the plant 103. At the same time, in the light intensity distribution of FIG. 5 based on the special structure of the light pattern 104, the high light intensities of the light points C2 and C3 corresponding to both sides of the peripheral portion of the light pattern 104 can be still maintained, and will not be weakened as it moves away from the light source 101. A light point C1 is closest to the light source 101, so that the light point C1 still has a high light intensity. Thus, when the light pattern 104 covers the plant 103, the light intensities of the light points C1, C2, and C3 of the plant 103 can be approximately similar or equal. Therefore, the light intensity distribution can be formed, wherein the light intensity near the light source 101 is equal to a light intensity far from the light source 101, and can conform to the growth shape of plant 103 and achieve the uniform illumination.

Figure 6:
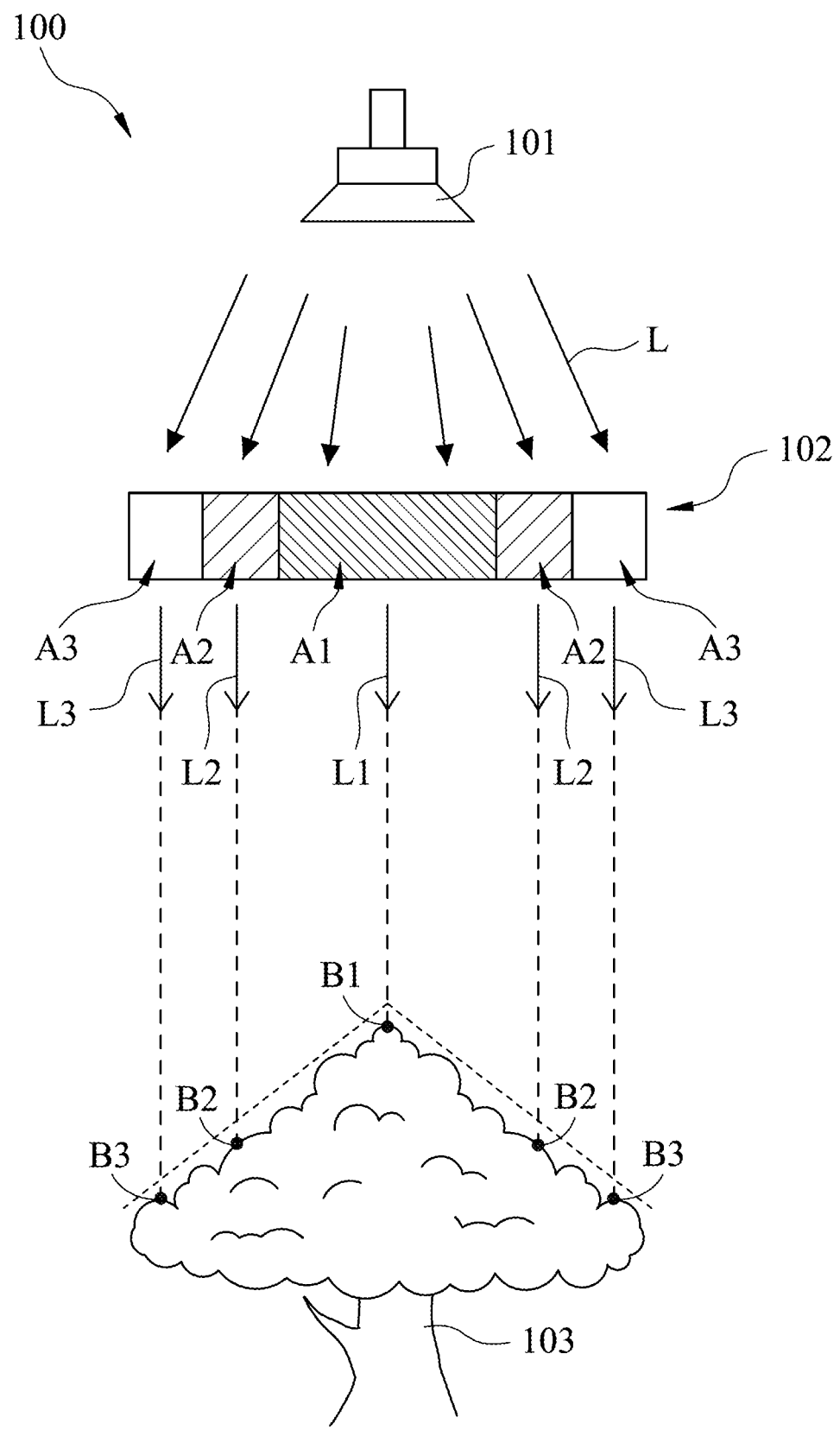
FIG. 6 is a schematic view of a using state of an illuminating device according to another embodiment of the present disclosure.

FIG. 6 is a schematic view of a using state of an illuminating device 100 according to another embodiment of the present disclosure. The illuminating device 100 includes a light source 101 and a light-pattern generating member 102. The light source 101 emits an incident light L. The light source 101 can be various types, for example, the light source 101 can be composed of an inorganic lighting emitting diode or an organic lighting emitting diode or be a bulb, and the present disclosure will not be limited thereto. The light-pattern generating member 102 is disposed on a side of the light source 101 to receive the incident light L and can be passed through by the incident light L. In the embodiment of FIG. 6, the light-pattern generating member 102 includes three shading areas, which are a shading area A1, a shading area A2 and a shading area A3, respectively. The number of the shading areas can be changed as actual conditions, and will not be limited thereto. The shading area A1, the shading area A2 and the shading area A3 are sequentially arranged from a central portion of the light-pattern generating member 102 to a peripheral portion of the light-pattern generating member 102, respectively. Further, the shading area A2 is arranged outside of the shading area A1, and the shading area A3 is arranged outside of the shading area A2. The shading area A1, the shading area A2 and the shading area A3 have different shading rates, respectively. In one embodiment, the shading rates of the shading area A1, the shading area A2 and the shading area A3 decrease from the central portion of the light-pattern generating member 102 to the peripheral portion of the light-pattern generating member 102. In detail, the shading rate of the shading area A1 is greater than the shading rate of the shading area A2, and the shading rate of the shading area A2 is greater than the shading rate of the shading area A3. Therefore, when the incident light L passes through the shading area A1, the shading area A2 and the shading area A3, a transmission light L1, a transmission light L2 and a transmission light L3 are generated correspondingly. The light intensity decay rates of the transmission light L1, the transmission light L2 and the transmission light L3 decrease from the central portion of the light-pattern generating member 102 to the peripheral portion of the light-pattern generating member 102. That is, a light intensity decay rate of the transmission light L3 is smaller than a light intensity decay rate of the transmission light L2, and a light intensity decay rate of the transmission light L2 is smaller than a light intensity decay rate of the transmission light L1. Therefore, when the incident light L emitted from the light source 101 passes through the light-pattern generating member 102 and illuminates the plant 103, the light intensity can be adjusted according to the irregular shape of the plant 103 so as to make the illumination more uniform. For example, in the embodiment of FIG. 6, an area of the plant 103 receiving light is represented by a light point B1, a light point B2 and a light point B3, respectively. The area of the plant 103 receiving light is not a regular shape, and often changes depending on its natural growth conditions. In the embodiment of FIG. 6, the light point B1 is closest to the light source 101, the light point B2 is the second, and the light point B3 is farthest from light source 101. If the plant 103 is directly illuminated with only a single light source 101, due to a distance between each of the light points and the light source 101, a light intensity of the light point B1 is the strongest, a light intensity of the light point B2 is the second, and a light intensity of the light point B3 is the weakest. Thus, the growth of plant 103 will be affected due to the uneven illumination. The light intensity decay rates of the transmission lights L1, L2 and L3 generated after the incident light L passes through the light-pattern generating member 102 can be adjusted by forming the shading areas with different shading rates on the light-pattern generating member 102. Therefore, the effect of uneven illumination due to the different distances can be eliminated. Hence, in the embodiment of FIG. 6, the transmission light L1 illuminating to the light point B1 has the highest light intensity decay rate, the transmission light L2 illuminating to the light point B2 has the second light intensity decay rate, and the transmission light L3 illuminating to the light point B3 has the lowest light intensity decay rate. Therefore, a light intensity distribution can be generated, wherein the light intensity near the light source 101 is equal to the light intensity far from the light source 101. That is, the light intensity distributions of the light point B1, the light point B2 and the light point B3 are the same, so as to form a uniform illumination.

Figure 7:
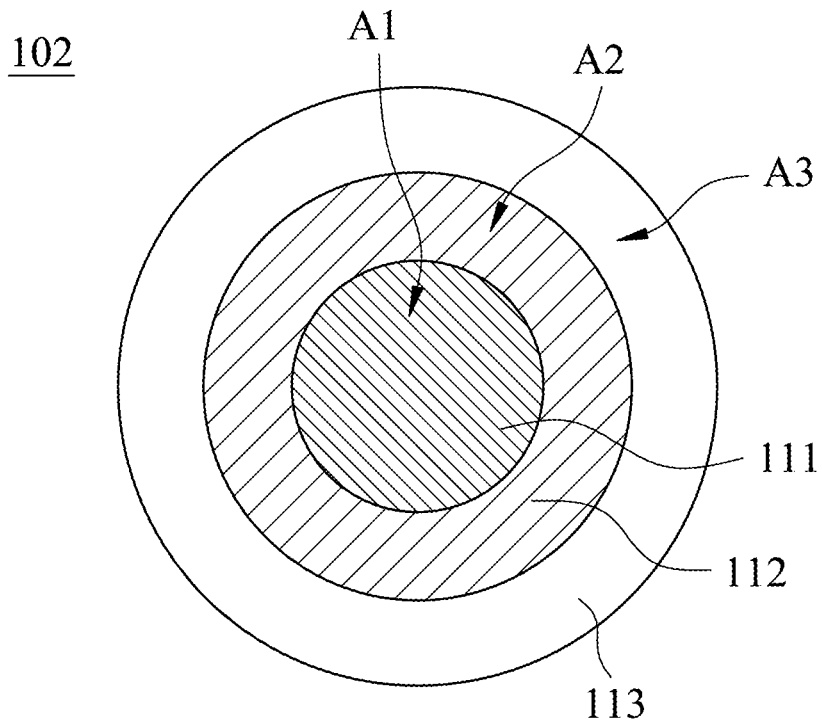
FIG. 7 is a structural schematic view of the light-pattern generating member of the illuminating device according to the embodiment of FIG. 6.

FIG. 7 is a structural schematic view of the light-pattern generating member 102 of the illuminating device 100 according to the embodiment of FIG. 6. The preceding paragraph have explained that the transmission lights L1, L2 and L3 with different light intensity decay rates can be generated after the light source 101 emits the incident light L to the shading areas A1, A2 and A3 with different shading rates. In order to achieve the above effect, the present disclosure provides a variety of structures which can adjust the shading rates of the shading areas A1, A2 and A3. In the embodiment of FIG. 7, the shading areas A1, A2 and A3 include a shading material 111, 112 and 113, respectively. The shading material 111, 112 and 113 can be a film formed by printing, vapor depositing, sputtering or other methods, or can be composed of different dyes or different pigments, respectively. Therefore, not only a difference of the light intensities, but also a variation of the wavelengths can be formed. Please refer to FIG. 6 again, when the shading materials 111, 112 and 113 have different filtering effects, the wavelengths of the transmission lights L1, L2 and L3 can be different from the wavelength of the original incident light L. Further, the wavelengths of the transmission lights L1, L2 and L3 can also be different. Therefore, the light intensities and the wavelengths can be adjusted according to different growing parts or different needs of the plant 103.

Figure 8:
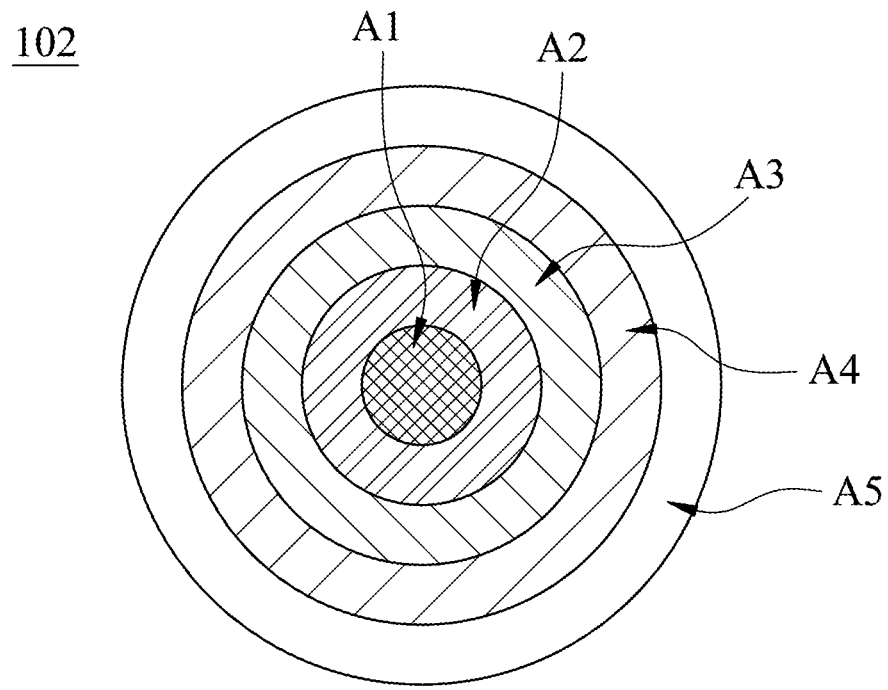
FIG. 8 is a structural schematic view of a light-pattern generating member according to further another embodiment of the present disclosure.

FIG. 8 is a structural schematic view of a light-pattern generating member 102 according to further another embodiment of the present disclosure. In the present disclosure, the number of the shading areas formed on the light-pattern generating member 102 can be changed according to actual conditions so as to generate a plurality of transmission lights with different light intensities. In the embodiment of FIG. 8, the light-pattern generating member 102 includes a shading area A1, a shading area A2, a shading area A3, a shading area A4 and a shading area A5. By adjusting the number of the shading areas, the variation of the light intensity decay rates of the transmission lights can be denser, and the more complex shape of the plant can be corresponded to.

Figure 9:
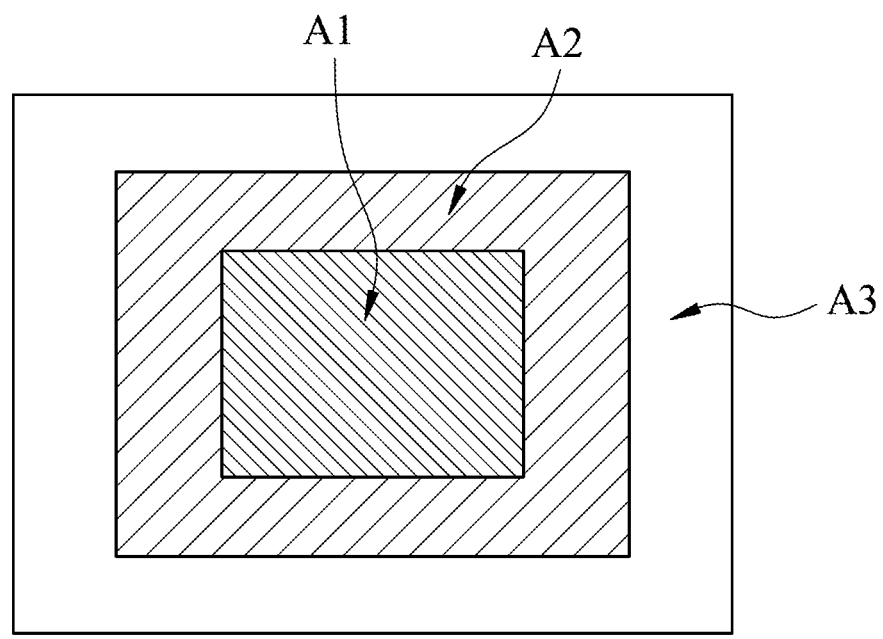
FIG. 9 is a structural schematic view of a light-pattern generating member according to yet another embodiment of the present disclosure.

FIG. 9 is a structural schematic view of a light-pattern generating member 102 according to yet another embodiment of the present disclosure. In the aforementioned embodiment of FIG. 7, the light-pattern generating member 102 is circular, and the shading areas A1, A2 and A3 are also circular and concentrically arranged. In the embodiment of FIG. 9, the light-pattern generating member 102 is rectangular, and the shading areas A1, A2 and A3 are also rectangular. It should be mentioned that the shape of the light-pattern generating member 102 and the shape and the number of the shading areas can be changed according to actual conditions, and will not be limited to circular or rectangular and the number of the shading areas will not be limited thereto.

Figure 10:
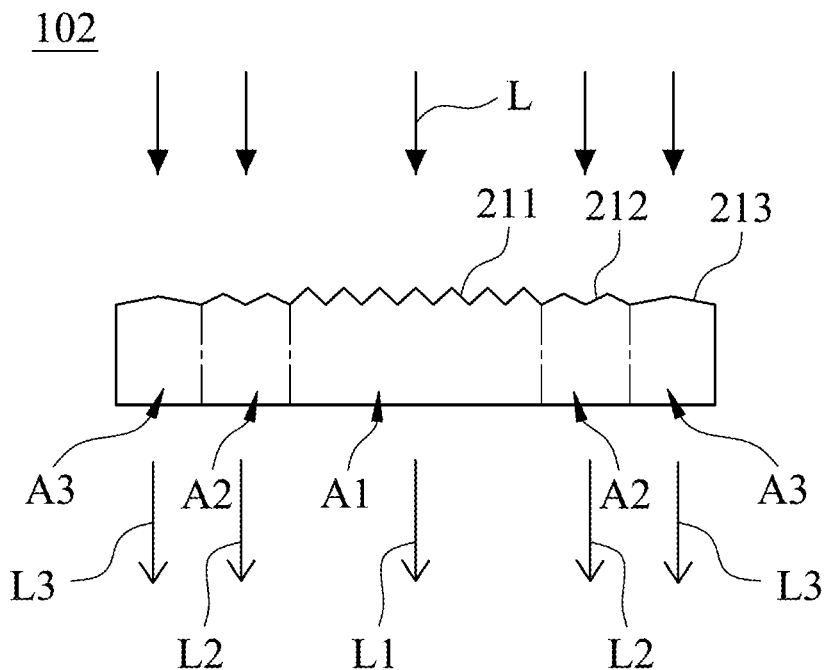
FIG. 10 is a structural schematic view of a light-pattern generating member according to still another embodiment of the present disclosure.

FIG. 10 is a structural schematic view of a light-pattern generating member 102 according to still another embodiment of the present disclosure. In addition to the shading rates can be changed by the different shading materials 111, 112 and 113 in the embodiment of FIG. 7, the shading rates can be also changed by the different geometric structure of the shading areas A1, A2 and A3 in the embodiment of FIG. 10. For example, in the embodiment of FIG. 10, the shading areas A1, A2 and A3 include a sawtooth structure 211, 212 and 213, respectively. When the incident light L passes through the light-pattern generating member 102, the sawtooth structures 211, 212 and 213 scatter the incident light L. Therefore, by the different arranging densities and amount of the sawtooth structures 211, 212 and 213 (the shading areas A1 has the sawtooth structures 211 with the largest number and the highest arranging density, the sawtooth structures 212 of the shading areas A2 is the second, the shading areas A3 has the sawtooth structures 213 with the least number and the lowest arranging density), the light intensity decay rate of the transmission light L1 is the highest, the light intensity decay rate of the transmission light L2 is the second, and the light intensity decay rate of the transmission light L3 is the lowest.

Figure 11:
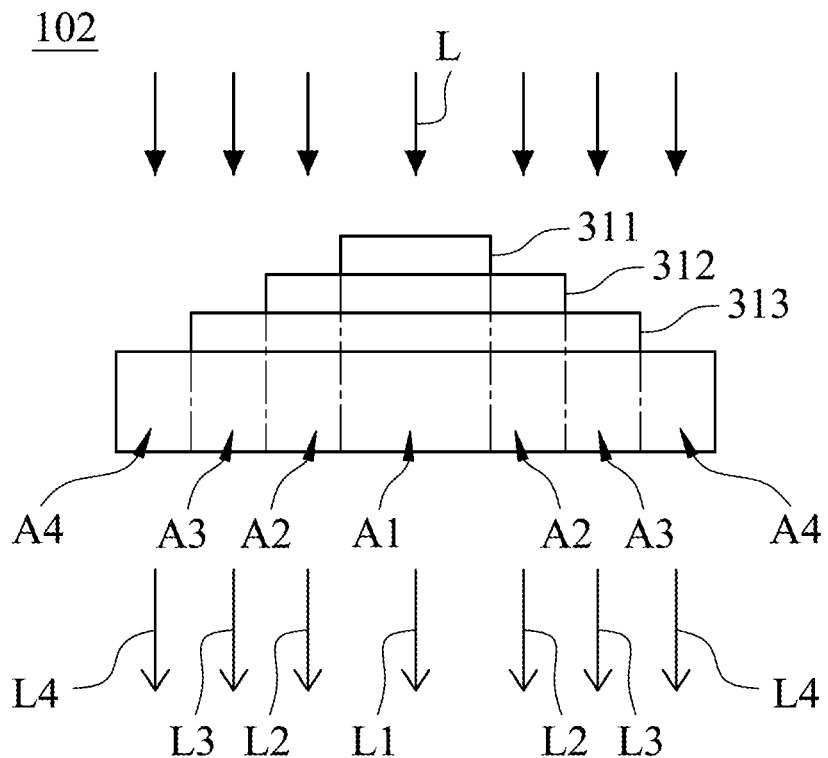
FIG. 11 is a structural schematic view of a light-pattern generating member according to further another embodiment of the present disclosure.

FIG. 11 is a structural schematic view of a light-pattern generating member 102 according to further another embodiment of the present disclosure. In the embodiment of FIG. 11, the shading materials 311, 312 and 313 of the light-pattern generating member 102 are stacked on each other so as to form the shading areas A1, A2, A3 and A4, respectively. When the incident light L passes through the light-pattern generating member 102, the transmission lights L1, L2, L3 and L4 with different light intensity decay rates can be generated. The light intensity decay rate of the transmission light L1 is the highest because it passes through the shading materials 311, 312 and 313 at the same time. The light intensity decay rate of the transmission light L2 is smaller than the light intensity decay rate of the transmission light L1 because it only passes through the shading materials 312 and 313. Similarly, the light intensity decay rate of the transmission light L3 is smaller than the light intensity decay rate of the transmission light L2 because it only passes through the shading material 313. The light intensity decay rate of the transmission light L4 is the lowest because the shading materials 311, 312 and 313 are not thereon.

Above, the present disclosure can form the shading areas with different shading rates via selecting different shading materials or changing the geometric structure of the light-pattern generating member 102. Therefore, the transmission lights with different light intensities can be generated, and which can form the uniform illumination according to the different shape of the plant, and so as to promote the plant growing.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An illuminating device for promoting a plant growing evenly, comprising:
    a light source emitting an incident light; and
    a light-pattern generating member disposed on a side of the light source to receive the incident light, wherein the light-pattern generating member is free of microstructures on a surface thereof, and the light-pattern generating member comprises:
        a first concave portion disposed on one side of the light-pattern generating member; and
        a second concave portion disposed on the other side of the light-pattern generating member;
    wherein the incident light passes through the light-pattern generating member so as to generate a transmission light, the transmission light generates a light pattern, a light intensity distribution is formed by the light pattern, the plant is covered by the light pattern, and the light pattern further comprises:
        a central portion corresponding to the first concave portion and the second concave portion; and
        a peripheral portion surrounding the central portion, and a light intensity of the peripheral portion is stronger than the central portion thereof;
    wherein a light intensity of a light point of the plant near the light source at a vertical distance is equal to a light intensity of another light point of the plant far from the light source at a vertical distance;
    wherein the light point of the plant near the light source is illuminated by the central portion of the light pattern, and the other light point of the plant far from the light source is illuminated by the peripheral portion of the light pattern.

2. The illuminating device of claim 1, wherein the light-pattern generating member is a lens element.

* * * * *